July 31, 1956     N. E. MARTELLO     2,757,109
BEARING COMPOSITION, BEARING, AND METHOD OF MAKING SAME
Filed Nov. 13, 1952
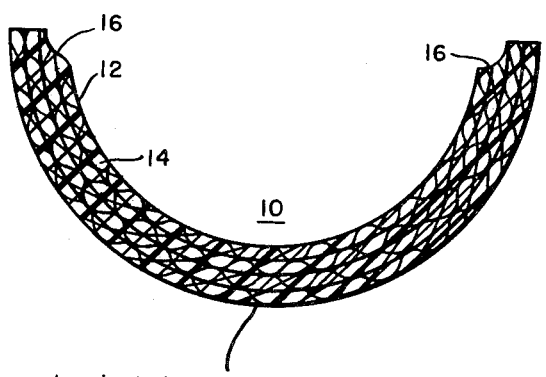
Laminated bearing structure comprising sheet fibrous base material impregnated with a phenolic resin composition having a solid lubricant dispersed therein.
WITNESSES
INVENTOR
Norman E. Martello.
BY
ATTORNEY

United States Patent Office 2,757,109
Patented July 31, 1956

2,757,109

BEARING COMPOSITION, BEARING, AND METHOD OF MAKING SAME

Norman E. Martello, Turtle Creek, Pa., assignor to Westinghouse Electric Corporation, East Pittsburgh, Pa., a corporation of Pennsylvania Application November 13, 1952, Serial No. 320,343

3 Claims. (Cl. 154—81)

This invention relates, generally, to a bearing material, an emulsified resin varnish for producing the same, and a method for making a bearing therefrom.

It has been proposed, heretofore, to introduce certain lubricating mineral compounds into a selected resinous composition, when the composition is to be used for forming a bearing. The purpose of adding the mineral compounds is to decrease the coefficient of friction of the bearing.

It is customary in producing compositions for such bearings, to prepare an emulsion with the resin and mineral compound while the resin is in the A-stage. A continuous sheet of paper or fabric is then impregnated with the emulsified resin, after which the resin is advanced by heat treatment to the B-stage.

A resinous bearing is generally made by stacking in a mold a number of strips, cut from a B-stage resin impregnated sheet, and then curing the resin to the final infusible C-stage by heat and pressure, thereby consolidating the strips into a laminated bearing unit.

Difficulty has arisen in producing such bearings in obtaining a satisfactory dispersion of the lubricating mineral compounds in the resinous compositions due to flocculation and uneven scattering thereof, and also obtaining a high bond strength in the laminated bearing prepared therefrom.

Further, there was the disadvantage in preparing the emulsified resins of the necessity to heat to temperatures of approximately 100° C. with constant stirring. The resulting suspensions had the furthehr disadvantage of being inherently of high viscosity. Even with the extensive preparations of heating and stirring, the suspensions had little stability, thus necessitating their immediate use.

An object of this invention is to provide an improved resinous bearing material having embodied therein, by means of a novel combined suspending-dispersing agent, a solid lubricant for lowering the coefficient of friction.

A further object of this invention is to provide a stable emulsified resin suitable for producing improved bearing materials, the resin having embodied therein a solid lubricant by means of a novel combined suspending-dispersing agent comprising a mixture of a suspending agent selected from at least one of the group consisting of carboxy methyl cellulose, methyl cellulose, casein, sodium alginate, and gum tragacanth, and a dispersing agent comprising a lignin sulphonate.

A further object of this invention is to provide a resinous laminated bearing of high bond strength, the resin having uniformly dispersed therein a solid lubricant for reducing the coefficient of friction.

A further object of this invention is to provide a method of making a resinous laminated bearing comprising the steps of impregnating a fabric sheet with an emulsified resin-varnish having uniformly suspended therein a solid lubricant, and then covering the impregnated sheet with a coating of substantially only phenolic resin.

Other objects of the invention will in part be obvious and will in part appear hereinafter.

For a more complete understanding of this invention, reference is made to the following description taken in conjunction with the accompanying drawing, the single figure of which is a cross-sectional view of a portion of a resinous laminated bearing structure having a solid lubricant dispersed therein.

I have discovered that certain solid lubricants can be successfully incorporated in phenolic resinous varnish compositions by means of a novel combined suspending-dispersing agent, thereby enabling the preparation of improved bearings. My suspending-dispersing agent is used to incorporate a solid lubricant in a water or alcohol soluble phenolic resin, and will provide a stable emulsified phenolic resin varnish, the viscosity of which may be varied as desired. Important advantages of my varnish are that little stirring and no heating are required in its preparation.

In the formulation of the emulsified phenolic resin varnish in accordance with my invention, a water or alcohol soluble phenol-formaldehyde, cresol-formaldehyde or a cresylic acid-formaldehyde resin the A-stage is used. In the production of the type of phenolic base resins referred to, 40% aqueous formaldehyde, paraformaldehyde or other polymers thereof and other aldehydes as well known to those skilled in the art are employed for reaction with the selected phenol. An example of a water soluble resin suitable for this application is described in the patent to Weltman et al. No. 2,579,637, issued December 25, 1951.

In the compositions of this invention there is embodied from 5% to 20% by weight of a finely divided solid lubricant for lowering the coefficient of friction of the bearing to be formed, selected from at least one of the group consisting of the sulphides, selenides, and tellurides of tungsten, molybdenum, and titanium. Molybdenum disulphide will be specifically referred to hereinafter.

As the suspending agent for the solid lubricant, I employ from 0.5% to 2% based on the weight of the phenolic resin varnish of at least one material selected from the group consisting of carboxy methyl cellulose, methyl cellulose, casein, sodium alginate, and gum tragacanth.

To prevent flocculating of the solid lubricant and suspending agent, a dispersing agent in the amount of from 0.1% to 3%, based on the weight of the phenolic resin varnish, of sodium or calcium lignin sulphonate or both is used. In order to ensure solubilizing of the dispersion agent, a small, but effective amount, in the order of 0.1% of an alkali, such as sodium hydroxide or potassium hydroxide, is added.

The components of the phenolic resin varnish formulation, except the solid lubricant, are admixed and stirred thoroughly in a mixer for a few minutes and the composition is then ready for the addition of the finely divided solid lubricant. The solid lubricant is added to the phenolic resin varnish and stirred for a few minutes until the solid lubricant is suspended therein. It is then ready for use as an impregnant for fibrous materials such as a fabric or paper to be later molded into laminated or other fibrous reinforced bearings. Examples of other suitable fibrous materials are cotton duck, cambric and the like. The base fabric or paper may be impregnated with the phenolic resin varnish in any conventional manner, for example, as described in the patent to Weltman et al. No. 2,579,637.

The base fabric or paper is initially impregnated with an amount, sufficient to provide a resin ratio of from 1.4 to 2.0, of the emulsified phenolic resin with the solid lubricant suspended therein and then advanced to the B-stage. In order that the finished bearing will have a high bond strength, the initially impregnated sheet is further impregnated with a conventional varnish composed substantially only of phenolic resin, that contains no solid lubricant. The conventional phenolic varnish, is added to the previously impregnated fabric in an amount sufficient to provide a B-stage sheet having a resin ratio of from 1.8 to 2.5.

Resin ratio is defined as the ratio of the weight of the untreated fabric sheet plus the weight of the resin that is impregnated in the sheet, to the weight of the untreated sheet.

The B-stage sheets are cut to size and molded in a hot press at pressures of from 500 to 2000 p. s. i. and at temperatures of from 140° C. to 160° C.

In the accompanying drawing the structure illustrated comprises a bearing shell 10. For some purposes a bearing may include an additional upper section, similar to that illustrated, to form a full 360° bearing. The bearing shell 10 is formed of a plurality of laminations of sheet fibrous material 12 bonded together with a phenolic resin 14 under heat and pressure in accordance with the process herein described. The resin has a finely divided solid lubricant dispersed therein. At either edge of the shell 10 are chamfered grooves 16 for the introduction of water or other suitable lubricant.

The following is an example of the preparation of an emulsified resin varnish in accordance with my invention.

*Example I*

To 3.9 parts by weight of water was added 0.1 part by weight of sodium hydroxide, and 0.3 part by weight of calcium lignin sulphonate. The mixture was stirred until the ingredients were dissolved. To a separate quantity of 11.7 parts by weight of water was added 4 parts by weight of carboxy methyl cellulose, and this was stirred until the carboxy methyl cellulose was dissolved. Then while stirring 80 parts by weight of a water solution of an A-stage phenol-formaldehyde resin of the type described in the patent to Weltman et al. No. 2,579,637, containing 75% by weight of the resin, the previously prepared solutions of sodium hydroxide-calcium lignin sulphonate and the carboxy methyl cellulose were added, with stirring being continued for fifteen minutes thereafter. The emulsified phenolic resin composition was then ready for addition of the solid lubricant. There was then added 6.6 parts by weight of 325 mesh molybdenum disulphide to the composition with rapid stirring. In a few minutes an even suspension was produced.

The molybdenum disulphide may be added immediately to the phenolic composition and the suspension stored until ready for use or the molybdenum disulphide may be added later when desired, i. e. up to a time immediately preceding the impregnation of a fabric or paper with the phenolic resin-molybdenum disulphide suspension.

The composition was of such low viscosity that it was employed to impregnate 50 ounce woven cotton belting. The belting was well impregnated to provide B-stage phenolic resin and lubricant to a 1.5 ratio, and the molybdenum disulphide coated the cotton fibers evenly. The belting was further impregnated with a varnish comprising substantially only the phenolic resin used in the making of the suspension, and advanced to the B-stage to provide the belting with a total resin ratio of 1.9. A plurality of plies of the impregnated belting were superimposed and molded in a hot press to produce a well bonded laminated bearing. The uniformly distributed molybdenum disulphide in the phenolic resin of the bearings provided for outstanding low coefficient of friction in use.

*Example II*

An emulsified resin varnish was prepared in the same manner as described in Example I, except that an alcohol soluble cresylic acid-formaldehyde base resin with isopropyl alcohol as a solvent was used.

The preparation of the emulsified resin varnishes of my invention is greatly simplified over those known in the prior art as no heat and little stirring is required. After its preparation, it may be satisfactorily stored for considerable periods of time before use, either with or without the solid lubricant suspended therein.

The solid lubricant is dispersed throughout the resin with a remarkable degree of uniformity. The uniformly distributed solid lubricant facilitates making a bearing having an outstanding coefficient of friction in use.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. An emulsified potentially thermosettable phenolic resin varnish comprising a solvent selected from the group consisting of water and alcohol and a phenolic resin selected from the group consisting of water soluble and alcohol soluble phenolic resins derived by reacting a phenol selected from the group consisting of phenol, cresol, and cresylic acid with an aldehyde selected from the group consisting of formaldehyde and paraformaldehyde, having admixed therewith an aqueous suspension comprising from 0.5% to 2% by weight of a suspending agent selected from the group consisting of carboxy methyl cellulose, methyl cellulose, casein, sodium alginate, and gum tragacanth, from 0.1% to 3% by weight of a dispersing agent selected from the group consisting of sodium and calcium lignin sulphonate, and substantially 0.1% by weight of an alkali to solubilize the dispersing agent, there being suspended and dispersed in the emulsified resin varnish, from 5% to 20% by weight of at least one solid lubricant selected from the group consisting of the sulphides, selenides, and tellurides of tungsten, molybdenum and titanium.

2. In the method of making a laminated bearing, the steps comprising impregnating a sheet fibrous base material to a resin ratio of from 1.4 to 2.0 with an emulsified A-stage potentially thermosettable phenolic resin varnish comprising a solvent selected from the group consisting of water and alcohol and a phenolic resin selected from the group consisting of water soluble and alcohol soluble phenolic resins derived by reacting a phenol selected from the group consisting of phenol, cresol, and cresylic acid with an aldehyde selected from the group consisting of formaldehyde and paraformaldehyde having admixed therewith an aqueous suspension comprising from 0.5% to 2% by weight of a suspending agent selected from the group consisting of carboxy methyl cellulose, methyl cellulose, casein, sodium alignate, and gum tragacanth, from 0.1% to 3% by weight of a dispersing agent selected from the group consisting of sodium and calcium lignin sulphonate, and substantially 0.1% by weight of an alkali to solubilize the dispersing agent, there being suspended and dispersed in the emulsified resin varnish, from 5% to 20% by weight of at least one solid lubricant selected from the group consisting of the sulphides, selenides, and tellurides of tungsten, molybdenum and titanium, advancing the resin to the B-stage, further impregnating the base material with substantially only potentially thermosettable phenolic resin in the A-stage, advancing the added phenolic resin to the B-stage, the added phenolic resin being employed in an amount sufficient to provide the B-stage sheet fibrous base material with a total resin ratio of from 1.8 to 2.5, and molding a plurality of sheets of the impregnated base material under heat and pressure to advance the resin to the final, infusible C-stage, thereby consolidating the sheets into a bearing structure.

3. A laminated bearing prepared in accordance with the process defined in claim 2.

(References on following page)

References Cited in the file of this patent

UNITED STATES PATENTS

| | | |
|---|---|---|
| 1,458,943 | Kinney | June 19, 1923 |
| 1,976,433 | Cheetham | Oct. 9, 1934 |
| 2,061,931 | Benner et al. | Nov. 24, 1936 |
| 2,232,515 | Arnold et al. | Feb. 18, 1941 |
| 2,233,206 | Frederick | Feb. 25, 1941 |
| 2,385,320 | Greene et al. | Sept. 18, 1945 |
| 2,427,481 | Weible et al. | Sept. 16, 1947 |
| 2,433,643 | Beach et al. | Dec. 30, 1947 |
| 2,467,498 | Redfern | Apr. 19, 1949 |
| 2,489,228 | Rudd | Nov. 22, 1949 |
| 2,530,770 | Hopperstead | Nov. 21, 1950 |
| 2,548,757 | Adams | Apr. 10, 1951 |
| 2,581,301 | Saywell | Jan. 1, 1952 |
| 2,600,321 | Pyle | June 20, 1952 |